C. E. ROGERS.
METHOD OF AND APPARATUS FOR FAULT LOCATION ON ELECTRICAL CONDUCTORS.
APPLICATION FILED JUNE 11, 1917.

1,329,432.
Patented Feb. 3, 1920.

WITNESSES:
INVENTOR.
Clarence E. Rogers.

UNITED STATES PATENT OFFICE.

CLARENCE ELLAMS ROGERS, OF OAKLAND, CALIFORNIA.

METHOD OF AND APPARATUS FOR FAULT LOCATION ON ELECTRICAL CONDUCTORS.

1,329,432.  Specification of Letters Patent.  Patented Feb. 3, 1920.

Application filed June 11, 1917. Serial No. 174,064.

*To all whom it may concern:*

Be it known that I, CLARENCE ELLAMS ROGERS, a citizen of the United States of America, and a resident of Oakland, county of Alameda, and State of California, have invented a new and useful Improvement in Methods of and Apparatus for Fault Location on Electrical Conductors, of which the following is a specification.

My invention relates to that class of electrical testing instruments which are used to make fault locations on electrical conductors such as are used in telegraph, telephone, signal and other electrical distribution systems. There are in use several types of electrical testing instruments which may be used to locate faults on electrical conductors, one of which is the Wheatstone bridge. Patents are now issued (see United States Letters Patent #739569, #754402, #859556, and #1057817), relating to Wheatstone bridges for use in locating faults on electrical conductors, their object being to enable inexperienced persons to make fault locations on electrical conductors of uniform resistance per unit of length.

The objects of my invention are to enable persons inexperienced in the use of electrical testing instruments to make fault locations on electrical conductors made up of several wires, which have like or unlike resistances per unit of length, connected in series, and to enable persons expert in the use of electrical testing instruments to make accurate fault locations in a shorter interval of time than is possible when ordinary electrical testing instruments are used.

Figure 1:
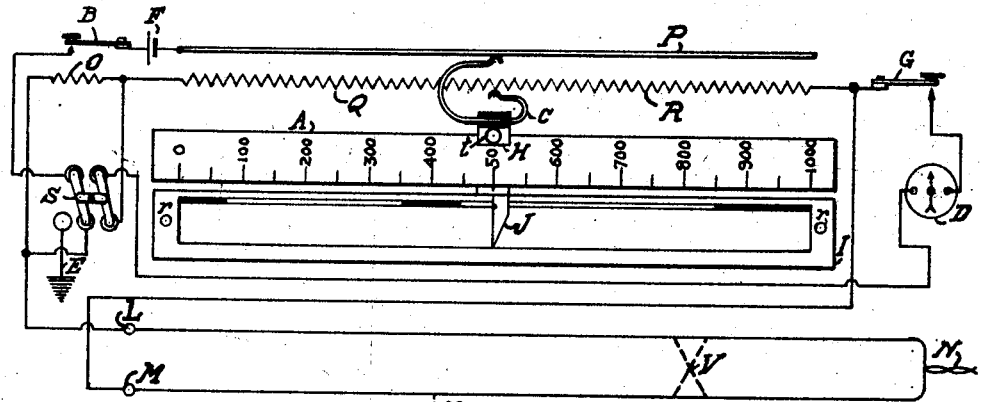
Figure 2:
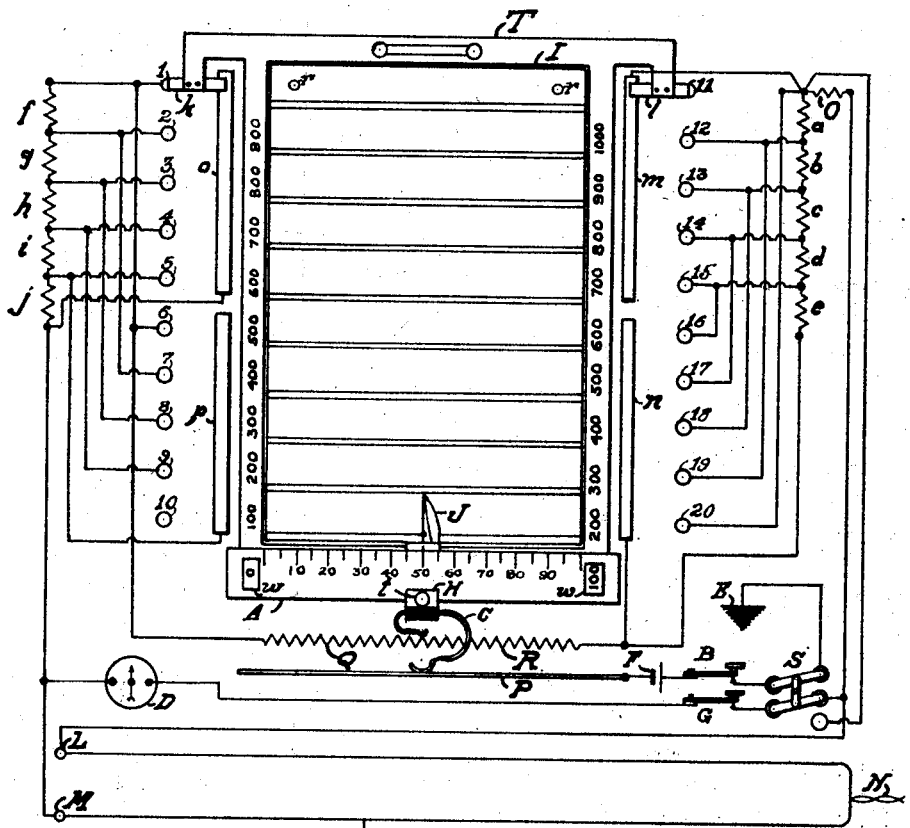

I attain these objects by incorporating in electrical testing instruments, calibrated records of the electrical conductors which are to be tested, as is illustrated in the accompanying drawings, in which;

Figure 1 is a diagrammatically illustrated slide wire Wheatstone bridge into which have been incorporated calibrated records of the electrical conductors on which it is desired to make fault locations, and Fig. 2 is a diagrammatically illustrated improved form of Wheatstone bridge, the use of which increases the accuracy of the fault locations made.

Similar characters refer to similar parts illustrated in the figures.

It is assumed at the outset that the various methods of locating faults on electrical conductors are well known and do not need to be described herein.

In Fig. 1, QR is a resistance of uniform conductance per unit of length; O is a resistance of known value and equal to the resistance of QR; A is a calibrated scale divided into a convenient number of divisions (1000 are illustrated); I is a removable record card; LNM is an electrical conductor connected to the instrument; F is a battery or other source of current; D is a galvanometer or other detector; B is a key to close the battery circuit; G is a key to close the detector circuit; C is a contact sliding on and connecting any point on the resistance QR to the contact bar P; HJ is an indicator, having an edge for use in drawing lines on the record cards, and supporting the contact C, and on the scale A and over the record card I; S is a switch; E is a ground connection; and $rr$ are pins for supporting the record cards in a definite location with respect to the scale A and to the resistance QR.

With the switch S thrown into the position shown in Fig. 1, the resistance of the conductor LNM can be measured by depressing the keys B and C and adjusting the indicator HJ until there is no deflection of the detector. The value of the resistance LNM will then be given on the solution of the following well known equation;

$$(\text{Resistance of LNM}) = \frac{(\text{resistance of R}) \times (\text{resistance of O})}{(\text{resistance of Q})};$$

that is, a particular ratio of the resistance of R to the resistance of Q indicates a particular value of resistance for the conductor LNM. The calibrated part of scale A is equal in length to the resistance QR and parallel thereto, therefore the ratio of the number of divisions on the scale A to the right of the indicator HJ to the number of divisions to the left of the indicator, is equal to the ratio of the resistance of R to the resistance of Q. Also since the record card I is supported parallel to the scale A and consequently to the resistance QR, a line drawn on the record card I, using a pen or pencil guided by the indicator edge, will graphically indicate thereon the same ratio.

Should there be a short circuit between the sides of the electrical conductor LNM at the location V, the conductor will have when measured from the terminals LM, a resistance different than that recorded when the complete conductor was in circuit. The resistance will also be indicated by a different ratio of the resistance of R to the resistance of Q, and consequently by a different line drawn on the record card I. Following this method there can be drawn on the record card I as many lines as there are resistance measurements made, each of the lines graphically representing on the record card, the location at which the short circuits were placed on the electrical conductor. As each line is drawn on the record card it is marked in such a manner; for instance, by designating the distance from the testing device, as to indicate the exact location of the short circuit on the electrical conductor. In practice, it is not necessary in using this electrical testing device to calibrate the record card at a great number of locations, but only at those locations at which two sizes of wire are joined, other lines being interpolated on the record card between the lines at which measurements are made as may readily be done when the distances between the wire junctions are known. Having calibrated a record card it is only necessary, when it is desired to locate a fault due to a short circuit on an electrical conductor with respect to which the record card was calibrated, to place the record card over the pins $rr$ and to adjust the indicator HJ until a balance is obtained. The location of the short circuit will then be indicated, graphically, under the indicator HJ, it not being necessary to make any calculations.

A similar method to that used and described for locating short circuits is used for locating grounds on an electrical conductor, with the exception that the connections of the device are changed to give the circuit arrangement used in making the well known Murray loop test.

Using the apparatus illustrated in Fig. 1, the switch S is thrown to the left and the bridge is balanced for grounds placed at various locations along the conductor, a line being drawn on the record card I each time a balance is obtained and suitably marked to indicate the location of the ground which was placed. A portion of the same record card as was used for short circuit tests can be calibrated with respect to grounds and used when locating faults, one calibration being used when locating short circuits and the other calibration being used when locating grounds. A record card calibrated in the manner described is used thereafter with the electrical testing device when it is desired to locate a fault due to a ground on the electrical conductor with respect to which the record card was calibrated, the indicator being adjusted until the bridge is balanced, when the location of the fault is read from the record card, graphically, it not being necessary to make any calculations.

In order to use the device for locating a cross between the conductor and a foreign conductor, the foreign conductor is grounded and then, using a record card calibrated with respect to grounds, locate the cross which is then, in effect, a ground on the conductor.

When a record card is calibrated with respect to breaks in an electrical conductor it can be used thereafter when it is desired to locate breaks in that conductor. In order to calibrate a record card in respect to breaks, an alternating current and an alternating current detector are used and measurements are made of the capacity unbalance of the two sides of the conductor with respect to ground, to breaks in the conductor at as many locations as desired. The values of the capacity unbalance to the different breaks will be different and will be indicated by different ratios of the resistance of R to the resistance of Q, also by different lines drawn on the record card. In order to locate a fault in an electrical conductor it is only necessary to use the record card associated with that conductor and calibrated with respect thereto, and to balance the bridge, the location of the break being read graphically from the record card.

In Fig. 2, the principle of and use of the apparatus is the same as that of the apparatus illustrated in Fig. 1, except for the following improvements. The resistance QR is arranged to form one tenth part of the total resistance of the ratio arms of the Wheatstone bridge, the resistances $a$, $b$, $c$, $d$, $e$, $f$, $g$, $h$, $i$ and $j$ connected to the switch contacts 1, 2, 3, 4, 5, 6, 7, 8, 9, 12, 13, 14, 15, 16, 17, 18, 19, 20, $m$, $n$, $o$ and $p$ are arranged so that they, at any position of the switches $k$ and $l$, form the remaining nine tenths of the ratio arm resistance. The part T in the drawing is a movable table upon which the calibrated record cards are placed while the part A is a scale rigidly supported by the base of the instrument. The movable table T slides under the scale A to any of its positions, each of its positions being indicated by the numbers at the two edges of the table T, the numbers being visible through the apertures $w$ $w$ cut through the scale A. The switch blades $k$ and $l$ are fastened to the table T, but insulated therefrom, and as the table T moves to its different positions under the scale A, different resistances are short circuited at the contacts to which they are connected in such a manner that at any of the positions of the table, the resistance QR will be connected at the proper part of the ratio arms; that is, with the table in the position shown in the figure the resistance QR forms the first one-tenth part of the total resistance of the ratio arms, with the table T moved down to the second, third, fourth, fifth, sixth, seventh, eighth, ninth and tenth positions, the resistance QR forms the second, third, fourth, fifth, sixth, seventh, eighth, ninth and tenth one-tenth parts of the total resistance of the ratio arms. As the table T moves under the scale A, its position as well as the division numbers which apply to the end divisions of the scale A are shown by the numbers appearing through the apertures *ww*. This electrical testing device is used and balanced in the same manner that the apparatus in Fig. 1 was used, except that in order to balance the apparatus shown in Fig. 2, both the indicator HJ and the table T are moved to that position at which there is no deflection of the detector D when the keys B and G are depressed. The record cards are calibrated and used in locating faults in the same manner as they were calibrated and used with the apparatus described in Fig. 1. By arranging the apparatus as shown in Fig. 2, record cards of a more convenient size can be used than it would be possible to use with the apparatus shown in Fig. 1, assuming that the testing devices shown in the two figures employed scales having the same effective length. Instead of having the ratio arm resistance divided into ten parts it can be divided into any number of parts depending upon the scale length it is desired to use.

Having described my invention, what I claim as new and desire to secure by United States Letters Patent is:

1. In a Wheatstone bridge, a pair of adjustable ratio arms comprising a slide wire resistance, a single contact engaging said resistance for adjusting the ratio of said arms, a third resistance arm, a fourth resistance arm, a conductor under test, switches for connecting said conductor under test in either the fourth arm or both the third and fourth arms, a current detector connected to two opposite junctions of said resistance arms, a source of electrical potential connected to the remaining opposite junctions, a card calibrated with respect to the conductor under test, and an indicator connected to said single contact for indicating on said card the location of the fault in said conductor.

2. In an electrical testing device, a pair of adjustable ratio arms comprising a slide wire resistance and adjustable resistances connected in series therewith, a single contact engaging said slide wire resistance for adjusting the ratio of said arms, a frame carrying contacts engaging said adjustable resistances connected in series with said slide wire resistance for connecting said slide wire resistance to form any sectional part of said ratio arms, a third resistance arm, a fourth resistance arm, a conductor under test, switches for connecting said conductor under test in either the fourth resistance arm or both the third and fourth resistance arms, a current detector connected to two opposite junctions of said resistance arms, a source of electrical potential connected to the remaining opposite junctions, a card carried by said frame and calibrated with respect to the conductor under test, an indicator connected to said single contact for indicating on said card the location of the fault on said conductor after said card has been positioned by the movement of said frame to cause the contacts carried thereby to engage the proper points in the adjustable resistances connected in series with the slide wire resistance.

Signed by me at Oakland, county of Alameda, and State of California, in the presence of two witnesses, this 1st day of June, 1917.

CLARENCE ELLAMS ROGERS.

Witnesses:
WILLIAM H. FELDMAN,
SAMUEL SPITZ.